United States Patent [19]  
Wheatley, Jr. et al.

[11] Patent Number: 4,847,660  
[45] Date of Patent: Jul. 11, 1989

[54] METHOD AND APPARATUS FOR REGISTRATION CONTROL IN AN ELECTROPHOTOGRAPHIC PRINT ENGINE

[75] Inventors: Maurice S. Wheatley, Jr., Duluth; Danny L. Slayton, Lilburn, both of Ga.

[73] Assignee: Colorocs Corporation, Norcross, Ga.

[21] Appl. No.: 194,815

[22] Filed: May 17, 1988

Related U.S. Application Data

[60] Continuation-in-part of Ser. No. 170,075, Mar. 15, 1988, Pat. No.

[51] Int. Cl.[4] .......................................... G03G 15/00
[52] U.S. Cl. .................................... 355/244; 355/77; 355/326
[58] Field of Search ............... 355/14 R, 14 C, 4, 3 R, 355/77, 3 TR

[56] References Cited

U.S. PATENT DOCUMENTS 4,330,196  5/1982  Yamaguchi ............................. 355/8
4,542,978  9/1985  Tarumi et al. ...................... 355/3 TR
4,652,115  3/1987  Palm et al. ....................... 355/14 TR Primary Examiner—R. L. Moses  
Attorney, Agent, or Firm—Jones, Askew & Lunsford

[57] ABSTRACT

A method and apparatus for controlling belt movement and separated image registration in a belt oriented full color double transfer electrophotographic print engine is disclosed. The photoreceptor and transfer belts have a ratio of lengths which is nominally equal to an integer. Independent servos control rotation of the belts driving each at a constant rotational period. The rotational periods are calculated so that their ratio is precisely equal to the above referenced integer value which is the nominal ratio of the belt lengths. A plurality of separated image creation and development control signals are provided under the control of an event timing clock. The event timing clock is preset to a predetermined modulo M value, M being the units of time for the targeted rotational period of the transfer belt, each time a reference pulse is provided from a reference station associated with the transfer belt indicating that a predetermined location on the transfer belt has arrived at the reference station. This temporally synchronizes image creation with the physical rotation of the transfer belt assuring proper registration of the images. Electrostatic binding forces between the photoreceptor and transfer belts are controlled by deposition of toner on the photoreceptor belt and selectively de-energizing a transfer corona when charged, non-image carrying, areas of the photoreceptor belt are in the transfer station. Initial, and intermediate if needed, registration of seam areas on the belts is provided for embodiments using seamed belts where the seams are inappropriate area for developing or maintaining images.

7 Claims, 2 Drawing Sheets

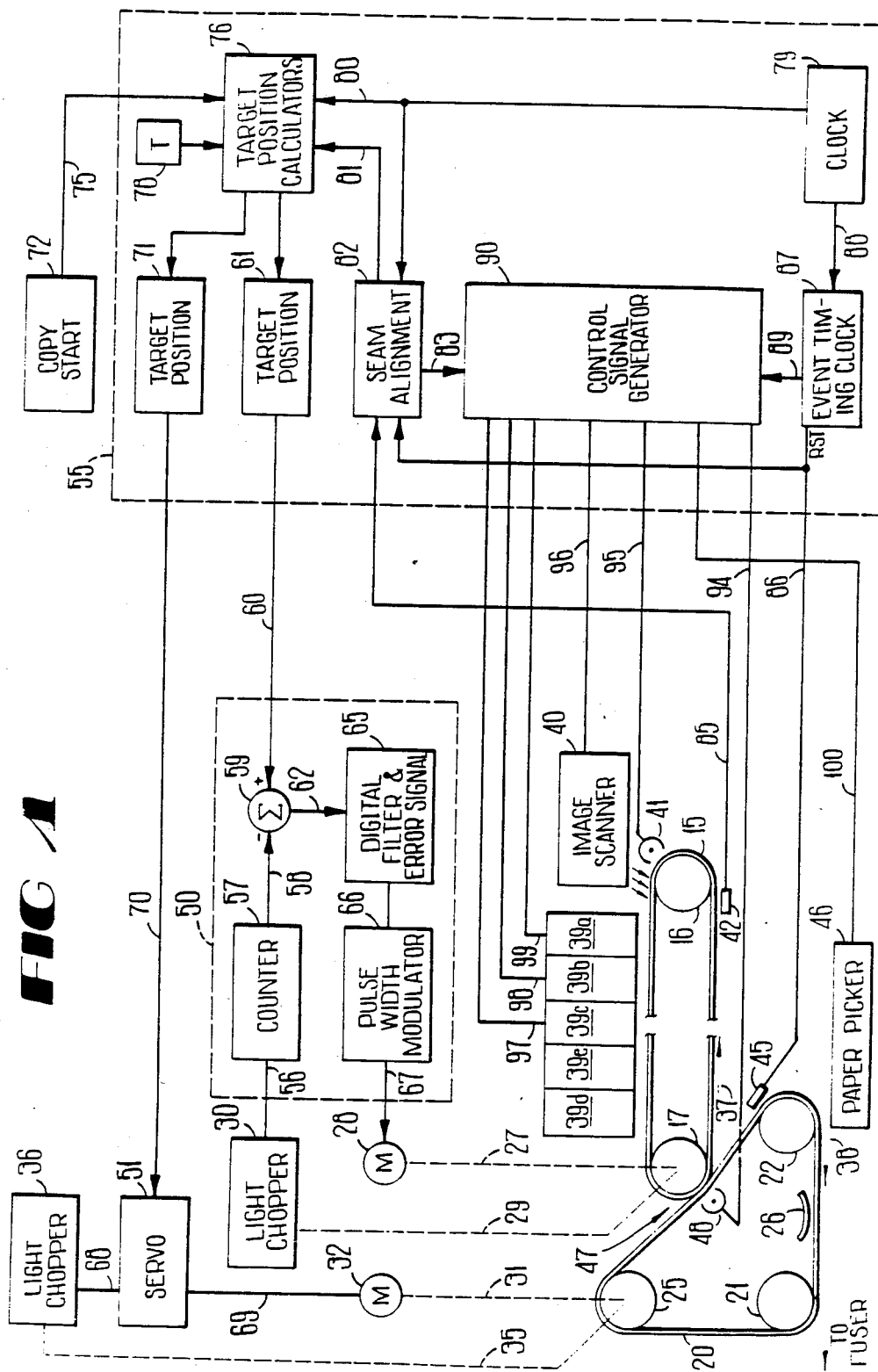

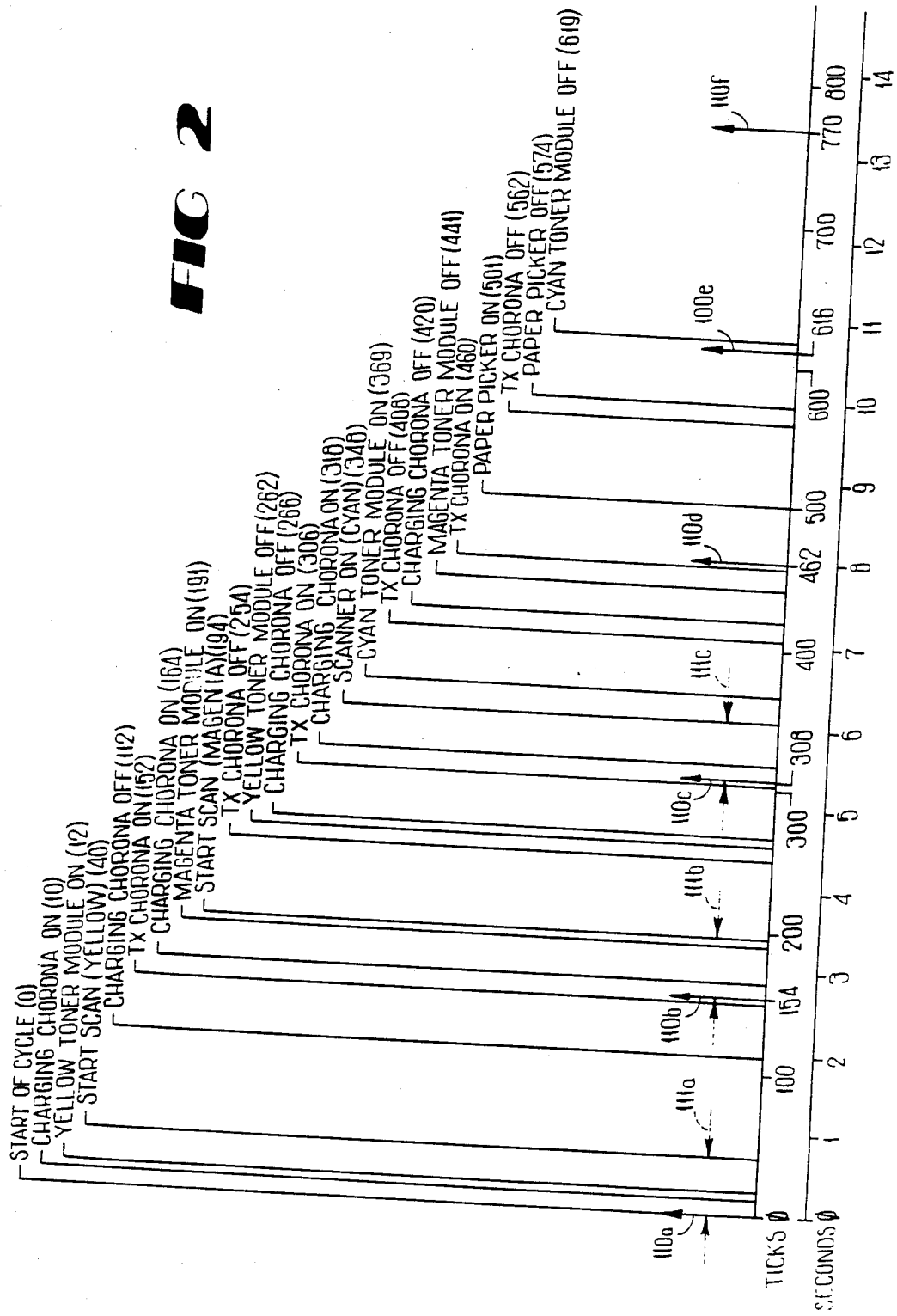

METHOD AND APPARATUS FOR REGISTRATION CONTROL IN AN ELECTROPHOTOGRAPHIC PRINT ENGINE

CROSS REFERENCE TO RELATED TO APPLICATIONS

This application is a continuation in part of copending application Ser. No. 170,075 filed Mar. 15, 1988, which is a continuation of application Ser. No. 929,121 filed Nov. 10, 1986, now abandoned, which in turn is a division of application Ser. No. 791,218 filed Oct. 25, 1985, now issued as U.S. Pat. 4,652,115.

TECHNICAL FIELD

The present invention relates to electrophotographic print engines and more particularly is an improved web registration and printing process controller for use in a full color electrophotographic print engine, particularly of the type employing flexible belts.

BACKGROUND OF THE INVENTION

U.S. Pat. No. 4,652,115 to Palm et al. issued Mar. 24, 1987, which is assigned to the assignee of the present invention, discloses what the inventors believe to be the first practical full color double transfer electrophotographic print engine employing flexible belts. Said U.S. Pat. No. 4,652,115 is hereby incorporated by reference exactly as if set forth in full herein. The machine in U.S. Pat. No. 4,652,115 discloses a precision servo mechanism for controlling separated image registration as the composite image is built up on the transfer belt. In the print engine of U.S. Pat. No. 4,652,115, as in the preferred embodiment of the present invention, the photoreceptor belt is selected to be of a length which is nominally two times the length of the transfer belt. Under circumstances in which there is a precise integer relationship between the lengths of the photoreceptor and transfer belt, no problems in registration arise so long as the belt speed control is uniform and sufficiently accurate for both belts. Naturally, the conventional wisdom of the prior art, prior to the invention shown in U.S. Ser. No. 4,652,115, was that variations in belt length made full color copiers employing flexible belts impractical since a precise integer relationship between the belt lengths can only be defined for a given set of age and temperature conditions. Since it is preferable to have somewhat different mechanical/chemical characteristics between the photoreceptor and transfer belts, they tend to have different coefficients of thermal expansion, and also tend to stretch at different rates due to aging, and the differing forces applied to the respective belts.

Therefore, U.S. Pat. No. 4,652,115 shows the first practical precise belt control mechanism for achieving accurate registration of a plurality of separated color component images and a process for overlaying same to create a full color composite image which is ultimately transferred to a final image receptor.

In the apparatus of Palm's patent, all electromechanical elements in the image path are slaved to the speed and position of the photoreceptor belt. Palm shows apparatus which made adjustments, on each rotation of the photoreceptor belt, to a servo defining target positions for predetermined points on the respective belts such that the same points on the belt would come in contact during each rotation. While the Palm apparatus represents a good and practical device, the entire arrangement can give rise to large error signal outputs from the servos controlling same. This leads to significant power consumption and a requirement for larger motors.

As disclosed in U.S. Pat. No. 4,652,115, significant electrostatic forces are often present at the transfer station or "nip" where the photoreceptor belt and transfer belt contact each other. Depending on how these forces are controlled, they can work to the advantage or disadvantage of any given synchronization and registration scheme. The main parameters which control force at the nip are the applied and latent electrostatic voltages present on the respective belts, the physical area of contact, normally defined by the "wrap" at the transfer station and the amount of toner present in the nip.

In particular, the inventors of the present invention have studied problems of attractive forces between belts in a double transfer electrophotographic print engine. It has been found that the presence and absence of toner at a wrapped transfer station causes the total attractive force between the belts to vary by two orders of magnitude. It is believed that the toner acts essentially as a lubricant although its effect as a dielectric may also be significant.

Of particular importance to the present invention is the discovery that even a background amount of toner in an image area at the transfer station of the preferred embodiment causes a significant reduction in attractive forces between the photoreceptor and transfer belt. In this context, a background amount of toner is the very slight amounts of toner which are deposited on an image area of the photoreceptor belt passing under the decorator roller of a development station for an uncharged belt area. In other words, it is the residual toner deposited on a portion of the photoreceptor belt which should appear as white (or at least one having a complete absence of the pigment being developed on a given separated image) in the final printed image.

When a typical transfer station transfer corona is activated and a charged area of the photoreceptor belt is passing through the transfer station, the attractive forces between the belts are extremely strong and same are essentially locked into synchronism so that their contacting surface areas must travel at the same linear velocity through the transfer station.

Therefore, in keeping the transfer corona on constantly except when the seam areas were in contact was an element of the registration control apparatus of Palm's U.S. Pat. No. 4,652,115.

Naturally, the above described condition of charge and undecorated PC belt will occur normally in the inter image areas of the PC belt between image areas of successive latent and developed separated images. Since such machines conventionally include a charging corona for applying a uniform surface charge condition to the PC belt prior to its entrance to an image exposure station, the portions of the belt which do not form part of the image area remain charged since they are not illuminated at the scanning station. Also, in order to keep machine contamination to a minimum, it is customary to deactivate all the toner modules as such non-image areas pass under same to prevent full development of non-image areas which causes waste of toner and contamination of the machine. Thus, during normal operation, these charged areas will arrive at the transfer station essentially free of toner and fully charged. If a transfer corona at the transfer station remains on as this passes through the transfer station, it is virtually impossible for the belts to slide past each other to any degree.

As is also disclosed in U.S. Pat. No. 4,652,115, many of the practical physical devices for implementing photoreceptor and transfer belts are best constructed by employing a seamed belts, i.e., ones which are fabricated as an elongated sheets and joined end to end at a seam to form closed belts. Naturally, the seam represents a significant discontinuity in the surface characteristics of the belt and attempts to develop electrostatic images on the photoreceptor seam, or transfer and retain them on the seam of the transfer belt, should be avoided. In general, a seam area is a species of a non-image developing area on a photoreceptor medium and the seam on a transfer belt may be considered a non-image receiving area.

It should be noted that in the specification the terminology "image receptor", unless otherwise noted or improper from the context, is used to define an ultimate print receptor such as a sheet of paper, sheet of transparent material, or the like. An image receiving web refers to a web for receiving developed images comprising patterns of toner materials and also includes image receptors as a class. Therefore, image receiving web may be considered as a generic term which includes transfer belts and any belt or web material carrying an image receptor. The image receptor is the physical material which carriers the ultimate output of the electrophotographic print engine.

One of the difficulties encountered in the control apparatus disclosed in Palm'patent arises from the integer multiple relationship between the respective belt lengths wherein said integer is greater than one. In the preferred embodiment disclosed in Palm, as in the preferred embodiment of the present invention, the referenced integer is two since the photoreceptor belt is nominally twice the length of the transfer belt. In a position synchronizing registration control scheme such as that disclosed in Palm, there is only one opportunity (at the alignment of the seam areas) each two revolutions of the transfer belt in which to make an adjustment if there is a broad area of the nip between the transfer and photoreceptor belts.

U.S. Pat. No. 4,330,196 to Yamaguchi shows a desk top single transfer monochromatic electrophotographic print engine in which four small DC motors are used as prime movers in the machine. The motor on the decorator roller (rotating sleeve) of the development station is operated independently of the other three which need to be substantially synchronized. The other three motors drive the photoreceptor drum, the scanner, and the fuser mechanism. There are no substantial problems with registration presented in the type of print engine disclosed in Yamaguchi since the only registration problem to be solved in such a machine is accurate paper picking so that the leading edge of the paper or other image receptor will register with the leading edge of the developed image area.

Therefore, there is a need in the art for a photoreceptor/image receiving web synchronization arrangement for a full color electrophotographic print engine wherein photoreceptor and image receiving web may be driven at slightly different speeds, but which will still accomplish the accurate registration for a full color electrophotographic printing of the control apparatus disclosed in the Palm's patent.

SUMMARY OF THE INVENTION

The present invention is a method and apparatus of controlling registration and synchronization between a photoreceptor web and an image receiving web particularly suited for full color electrophotographic print engines. The preferred embodiment of the present invention is employed in a full color double transfer electrophotographic print engine in the environment of a photocopying machine. The present invention has equal utility in electrophotographic print engines used in laser printers, digital copiers, and similar machines.

Broadly stated, the method of the present invention includes the steps of starting separate motors driving the photoreceptor web and image receiving web. Each of the motors is operated under the control of an independent servo mechanism so there is no direct speed slaving between the motors. If the webs in questions are of the type having a non-imaging developing area and a non-image receiving area, such as is the case with seamed belts, the first step is to acquire information on the relative positions of predetermined reference points on the belt and to align the seams so that they contact each other, at least when the seam on the longer web is in contact with the shorter web. Subsequently, each of the servos is controlled so that it drives the respective webs such that they have respective constant rotational periods. The relationship between the constant rotational periods is equal to the nominal relationship of the lengths of the webs and this relationship will always nominally be an integer.

As used in this specification, the statement that the length of one belt is nominally an integer multiple of the length of another means that reasonable attempts have been made to achieve that relationship exactly, but they may have respective lengths of the belt will differ from this nominal ideal value by an amount which, if the belts were simply free run at the same speed, would cause significant registration problems in full color electrophotographic printing. As is known to those skilled in the art, such deviations from the ideal integer relationship in the ratio of lengths are caused by differing thermal and aging characteristics, as well as the existence of an acceptable range of belt lengths which must be tolerated to make same economically manufacturable.

The method of the present invention includes provision of an apparatus for detecting passing of predetermined points on the respective webs past predetermined reference points fixed within the machine. It also includes provision of an event timing clock, the output of which is decoded into a plurality of separated image creation and development steps for controlling the scanner, toner modules, coronas, paper pickers, and similar devices within the print engine.

Each time passage of the predetermined reference point on the image receiving web past the fixed reference station is detected, the event timing clock is set to a predetermined value. In the preferred embodiment, five values having a modulo M (M being an integer) predetermined values are selected, but it is clearly within the scope of the preferred embodiment to make the predetermined value identical upon each passage of the reference point and to use another state counter to simply keep track of the current operating point in the complete composite image creation and development cycle. The steps of setting the event timing clock and sequentially initiating a sequence of separated image creation and development steps is repeated until all separated images are developed and the composite image is formed on the image receiving web.

In the preferred embodiment, the composite image is then transferred to a final image receptor, such as a sheet of paper, because the preferred embodiment is a double transfer machine. However, the invention has equal utility in an apparatus in which the image receiving web is a web carrying the image receptor and in which the composite image is built up directly on the image receptor from the individual separated images.

The apparatus of the present invention includes apparatus for performing the steps of the method, both method and apparatus being novel and non-obvious improvements to the art.

The event timing clock of the preferred embodiment is a precision clock driven by a precision high speed master clock of a typical microprocessor based controller, which counts defined copy cycle ticks. The important element for maintaining registration is the setting of the event timing clock to a predetermined value each time the signal is provided indicating the passing of the predetermined reference point of the image receiving web by the web's referenced station. Therefore, even if there are slight speed variations, both belts are being driven at respective constant speeds, and the principal registration determining event of beginning of the image scan will always start a predetermined period of time after the last provision of the image receiving web reference signal. This will assure proper registration of the leading edge of the next developed separated image on the photoreceptor and the leading edge of any previously transferred image on the image receiving web.

An important aspect of the present invention is design and control of the print engine such that the independent servos controlling the motors driving the respective webs can in fact control the motors to drive the webs at the desired speeds without generating accumulated large error signals and without step wise incremental corrections from sudden belt slips. In other words, it is important to design and control the print engine so that the servos may do their job without external forces tending to advance or retard the speed of movement of either belt being strong enough to overcome the action of the servo and the torque of the motor. To this end, the above referenced discoveries of the present inventors have been applied so that this goal is achieved. In particular, it is impractical to use motors of sufficient size to overcome the attractive forces between the belts if the photoreceptor belt is fully charged, there is no toner deposited thereon, and the transfer corona is on. Therefore, this condition has been avoided by keeping track of the physical locations of the fully charged non-image areas on the photoreceptor belt, and turning off the transfer corona when the areas arrive at the transfer station. While there is still a significant attractive force between the belts due to the charge condition of the PC belt, turning off the transfer corona reduces the attractive force between the belts to a sufficient degree to allow any necessary belt slip due to speed differences to occur in a smooth and uniform manner. It should be noted that inattention to this detail in a machine employing servos using the same control signals could easily lead to incremental correction slip of the belts. This must be avoided in practical print engines of the type in which the preferred embodiment of the present invention is employed.

Therefore, it is an object of the present invention to provide an improved photoreceptor/image receiving web synchronization apparatus which included no direct slaving of web speeds. It is another object of the present invention to provide an improved belt synchronization and registration method and apparatus in which the photoreceptor web and image receiving web servos are operated independently, and the only link therebetween is the logical link which arises from the fact that both are being controlled to have constant rotational periods which are related to each other.

It is still a further object of the present invention to provide an improved belt synchronization and registration apparatus particularly useful in a belt oriented double transfer full color electrophotographic print engine. It is still a further object of the present invention to provide an improved belt synchronization and image registration method and apparatus for an electrophotographic print engine in which respective photoreceptor and image receiving webs may be driven at slightly different speeds without adversely impacting registration. That the present invention achieves these objects will be appreciated from the detailed description of the preferred embodiment below.

BRIEF DESCRIPTION OF THE DRAWINGS

FIG. 1 is a block diagram of the preferred embodiment of the present invention.

FIG. 2 is a timing diagram of the predetermined sequence of separated image creation and development step control signals used in the preferred embodiment.

DETAILED DESCRIPTION OF THE PREFERRED EMBODIMENT

FIG. 1 shows a block diagram of the preferred embodiment of the present invention. As noted hereinabove, the disclosure of U.S. Pat. No. 4,652,115 to Palm et al. is incorporated by reference. The architecture of the environment of preferred embodiment is a full color copying machine of essentially the same type as disclosed in U.S. Pat. No. 4,652,115. It will therefore be appreciated by those skilled in the art that any detail needed to completely understand operation of a print engine of this type may be found in the specification of the Palm patent. The inventors believe that those skilled in the art will fully appreciate the operation of the present invention from the four corners of the present specification.

A photoreceptor-belt 15 is rotated about an idler roller 16 and a powered roller 17. Appropriate belt tension adjustment devices (not shown) are naturally included in the copier.

The image receiving web of the preferred embodiment is transfer belt 20 which moves about idling rollers 21 and 22 and powered roller 25. Additionally, a grounding plate 26 which forms a part of the composite image transfer station at which a complete developed composite image is transferred to a final image receptor, is shown in contact with belt 20. Dashed line 27 indicated the mechanical connection between roller 17 and the DC motor 28 driving the photoreceptor belt. Similarly, dashed line 29 indicates the mechanical connection between roller 17 and light chopper 30. Light chopper 30 is of conventional construction and includes light emitting and detecting elements, the optical path between which is chopped by a toothed rotating wheel. Such devices are conventional in the art and the preferred embodiment of light chopper 30 is described in the Palm's patent.

Similarly, dashed line 31 indicates the mechanical connection between roller 25 and motor 32 which drives transfer belt 20. Dashed line 35 indicates a mechanical connection between roller 25 and light chopper 36 which is identical to light chopper 30. The directions of rotation of belts 15 and 20 are shown by arrows 37 and 38, respectively.

A plurality of development stations, or toner modules, 39a through 39e, are shown over photoreceptor belt 15. In the preferred embodiment, development stations 39a through 39c contain the full color process toners, yellow, magenta, and cyan, respectively. Modules 39d and 39e are for monochrome black and any customer toner, respectively. Details of toner modules 39a through 39e are contained in the specification of the Palm's patent, and in particular the details of construction of practical toner modules which may be positioned in a downwardly pointing orientation over the photoreceptor belt are shown therein.

Block 40 represents the image scanner in the copier of the preferred embodiment. As noted hereinabove, the present invention has equal utility in electrophotographic print engines in machines having other image sources including digital copiers and laser printers. A conventional charging corona 41 charges belt 15 to a uniform surface charge condition prior to exposure to light as it passes under image scanner 40.

Blocks 42 and 45 represent optodetectors for detecting index notches on belts 15 and 20, respectively. Such devices are well known to those skilled in the art and, in particular, these are described in the specification of Palm's patent.

The respective locations on the belt paths of optodetectors 42 and 45 are arbitrary matters of design choice. The only requirement is that the positioning of same be coordinated with the spatial relationship between any seam areas on belts 15 and 20 and the respective index notches thereon so that the machine can keep accurate track of the actual locations of the seam areas during operation.

Block 46 represents a conventional paper picker which is used to select a sheet of image receptor material for insertion to the composite image transfer station under plate 26 when a complete composite image (or a single monochromatic image) has been developed on photoreceptor belt 15 and transferred to transfer belt 20.

The separated image transfer station is shown at 47 on FIG. 2 where photoreceptor belt 15 contacts transfer belt 20. A conventional transfer corona 48 is shown under transfer belt 20 at transfer station 47. This corona is used, in the customary fashion, to induce, by electrostatic attraction, the transfer of toner particles on a developed image on photoreceptor belt 15 to transfer belt 20. In the preferred embodiment of the present invention, transfer corona 48 is controlled by one of the separated image creation and development signals, in a manner described in detail hereinbelow.

The preferred embodiment is built around PC belt servo 50, transfer belt servo 51, and controller 55. Controller 55 is embodied by a high speed microprocessor, and other appropriate circuitry, the implementation of which will be apparent to those skilled in the art, both from this disclosure, and from the description of the machine controller contained in U.S. Pat. No. 4,652,115. It should be understood that the blocks shown within dashed line 55 represent a combination of physical devises, physical registers or other memory locations associated with the microprocessor, and logic implemented in firmware. The level of skill in the art of the design of microprocessor controllers has reached the point where excruciating details of a particular implementation is not necessary, so long as the functional relationships among the blocks are properly described. Therefore, those skilled in the art will understand implementation of same.

Servos 50 and 51 are identical and therefore only servo 50 is shown in detail. Servo 50 is of the type described in the Palm's patent and will be very familiar to those skilled in the art. In the preferred embodiment, servo 50 is implemented in firmware within the microprocessor (not shown) driving controller 55. In a conventional manner, light chopper 30 output a sequence of pulses on line 56 in response to rotation of roller 17. Counter 57 keeps count of these pulses and provides a digital signal on line 58 to a subtractive input to summing node 59. The other input to summing node 59 appears on line 60 as a digital representation of a target position from target position register 61 within controller 55. Again, the updating of the contents of target position register 61 is described in detail in the above referenced Palm specification. A digital position error signal appears on line 62 and is provided as an input to a conventional digital filter and error signal generator 65, the output of which is provided to a pulse width modulator 66. The pulse width modulator output appears on line 67 and controls the speed at which motor 28 is operated. In a similar manner, light pulses from light chopper 36 appear on line 68 and the output of servo 51 appears as a pulse width modulated control signal on line 69 to control the speed of motor 32. A digital output on line 70 from target position register 71 is the other input to servo 51.

Thus, it will be appreciated by those skilled in the art that image receiving web 20 is driven by a first servo controlled motor 32, controlled by servo 51. Similarly, photoreceptor web 15 is driven with a second servo controlled motor 28 controlled by servo 50.

Operation of controller 55 will now be described in connection with the sequence of steps comprising the preferred embodiment of the method of the present invention. Copying begins when a copy start signal is provided from block 72. It will be apparent to those skilled in the art that such signal is conventionally generated in response to selective operation of a button on a control panel (not shown) of a copying machine of the preferred embodiment. Naturally, in laser printers embodying the present invention, a digital control signal provided by a computer will constitute a copy start signal and will embody block 72 on FIG. 1. The copy start signal is provided on line 75 as an input to block 76 indicated as the target position calculators. In the preferred embodiment, target position is calculated by the above referenced microprocessor in firmware, in a manner described in the specification of Palm. The other inputs to block 76 represent the machine operating parameters which must be taken into account during calculation of target positions for belts 15 and 20. A register labeled T is shown at 78 within controller 55. In the preferred embodiment this represents a constant within the firmware driving the controller for the desired constant rotational period during which belt 20 should make one complete revolution, but it can be embodied by the contents of a particular memory location.

In the preferred embodiment the length of belt 20 is 493 millimeters and the desired belt speed, which has been found to give optimum results, is 184 millimeters per second. Thus, it takes approximately 2.66 seconds, for belt 20 to make one complete revolution. Thus, the value represented by T, which will be in units significantly smaller than seconds, will be the equivalent of approximately 2.66 seconds. The high speed master system clock is represented by block 70 which is a high speed crystal control clock associated with the microprocessor of a controller. Its output on line 80 which is provided as an input to target position calculator block 76 shows that target positions are calculated synchronously with the other signals within controller 55. Additionally, an input on line 81 is shown for target position calculator block 76. This input comes from a block indicated as seam alignment detector 82.

In the preferred embodiment, the function of seam alignment detector 82 is embodied by the firmware driving controller 55. In particular, the relative positions of the belts are detected once motion has commenced in response to the copy start signal from block 72. Seam areas are aligned by locating the belt seams since the distance between the index notches which activate optodetectors 42 and 45 and the respective seam area on belts 15 and 20 is known to sufficient accuracy. It should be noted that seam alignment need only be approximate since a substantial margin for error is provided between the location of the seam and any areas of the belts actually used for creating, developing, and transferring images.

Once seam synchronization has been accomplished, the signals on line 81 play no further part in the target position calculations unless seam realignment becomes necessary, as described hereinbelow. As is shown on FIG. 1, the output signals on lines 85 and 86 from index notch detectors 42 and 45, respectively, are provided as inputs to seam alignment block 82.

It should be kept in mind that, in the preferred embodiment, photoreceptor belt 15 is twice the length of transfer belt 20. The only critical aspect of belt lengths for the preferred embodiment is that the ratio of the length of the photoreceptor belt to the length of the transfer belt nominally be a positive integer greater than zero. With the foregoing background on the operation of the controller, the preferred embodiment of the method of the present invention will now be described. The user first selectively provides a copy start signed on line 75 by operating the device embodying copy start signal generator 72. Seam alignment takes place, as described hereinabove. Once this is accomplished, the steps embodying target position calculator block 76 access the value of the desired transfer belt rotational period T from register 78.

When the machine is started, controller 55 obtains an accurate measure of the lengths of belts 15 and 20 in the same manner as described in the Palm U.S. Pat. No. 4,652,115. This is accomplished by driving motors 28 and 32 and noting with precision the number of light chopper pulses occurring between occurrences of reference signal outputs from optodetectors 42 and 45. The stored value for belt length is used subsequently to calculate target positions (corresponding to motor speed) necessary to cause the belts to rotate with constant rotational periods.

Appropriate calculations are performed in the digital servos with upgraded target positions being provided in target position register 71 every 3 milliseconds. Similarly, the contents of target position register 61 are updated in a manner that causes motor 28 to drive belt 15 so that it has a constant rotational period equal to 2×T. Thus, servos 50 and 51 are operated independently since there is no calculated feedback mechanism between the two. The only relationship comes from the fact that they are trying to drive the respective belts they control so that each has a constant rotational period. The ratio of the constant rotational period of transfer belt 20 to the constant rotational period of photoreceptor belt 15 is equal to the nominal ratio of the belt lengths. Thus, it would be just as accurate a representation of the relationship between servos 50 and 51 to have shown separate registers for values representing rotational period T and rotational period 2×T which would further emphasize the independent operation of the servos.

Each time the predetermined reference point of the index notch (not shown) on transfer belt 20 passes the reference station embodied by optodetector 45, a reference signal is generated on line 86. This is shown as being provided to a reset input for event timing clock 87. The other input to event timing clock is a signal from the system master clock 79 which appears on line 88. The output of the event timing clock appears on line 89 as an input to control signal generator 90.

Event timing clock 87 is scaled to provide outputs indicative of a unit of time of sufficient precision to effect adequate registration of images in the preferred embodiment. Because of the way the event timing clock 87 is set to a predetermined value in response to signals on line 86, the magnitude of the units in which event timing clock operates is non-critical. As noted above, the transfer belt in the preferred embodiment is 493 millimeters long. This has been subdivided in the preferred embodiment to 154 increments each representing approximately 3.18 millimeters of belt length. Since the desired belt speed is 184 millimeters per second, the value of T is approximately 2.66 seconds. Therefore, the desired 2.66 second rotational period T for transfer belt 20 is also divided into 154 equal increments each of approximately 17.28 milliseconds. Each of these increments is referred to as a tick. It is in units of ticks, per this definition, that event clock 87 operates.

When servos 50 and 51 have motors 28 and 32 up to the desired speed to attain the desired rotational periods, the next occurrence of a reference signal on line 86 will start the copying cycle. Event timing clock is set to a predetermined value of zero in response to the first reference signal on line 86. Once this occurs, event timing clock 87 employs conventional counter/divider techniques to use the signals on line 88 from high speed clock 79 to output tick signals on line 89. In the preferred embodiment, event timing clock 89 is maintained as a stored and updated value in a microprocessor register.

Control signal generator 90 represents the function of providing appropriate separated image creation and development control signals on lines 94 through 100. In the preferred embodiment, this function is implemented by detecting the occurrence of particular count from the register containing the value for event timing clock 87, and writing an appropriate data word out to a particular register, the contents of which is decoded to the particular signals on lines 94 through 100. Those skilled in the art will appreciate that there are many other equivalent methods and devices for embodying control signal generator 90. The signals in these lines are output in an appropriate sequence to turn on charging corona 41, image scanner 40, and one of development stations 39a through 39c in order to shoot and develop the first separated image. The signal on line 94 controls operation of transfer corona 48. The important thing to note is that event timing clock 87 is set to a particular value in response to the next occurrence of a reference signal on line 86.

In the preferred embodiment, six discreet modulo 154 values are used as the values to which event timing clock 87 is set in response to each reference signal on line 86. It will be apparent that modulo 154 numbers were used since there are 154 ticks per revolution of belt 20. Thus, the first reference pulse on line 86 in the cycle sets clock 87 to zero, the second sets it to 154, and third to 308 . . . through the last which sets it 770 ticks. If multiple full color copies are being made, the cycle restarts for each copy.

Naturally, embodiments of the present invention can be constructed in which the event timing clock is reset to zero, or some other arbitrary number of ticks, upon each occurrence of a reference pulse. However, in such embodiments, an additional variable would have to be maintained to represent the particular pigment significance of the separated image being shot and developed. Also, since development stations 39a through 39c are laterally displaced along the length of photoreceptor belt 15, it is preferable to make sure that they are not turned on prematurely. Therefore, the signal for activating the toner modules would have to be offset as a function of the pigment of the separated image being developed. Thus, the inventors believe that the best mode of practicing the method of the present invention is to preset event timing clock 87 to a particular modulo M number, where M is equal to the number of time units counted by the event timing clock per revolution of the image receiving web 20, so that all of the information concerning the pigment of the image then being created and developed is embodied in the count of event timing clock 87.

As will be described in greater detail in connection with FIG. 2, the registration determining event, i.e., the start of the image scan, always occurs a predetermined period of time after the setting of event timing clock 87 to its predetermined value. Therefore, so long as the servos are accomplishing their attempted task of maintaining constant rotational periods of the two respective belts, the images will always be properly registered.

This leads to a discussion of the practical discoveries made by the inventors of the present invention with respect to how to deal with the significant electrostatic attractive forces between the photoreceptor web and the image receiving web which normally prevail in an electrophotographic print engine. As noted above, the brute force approach of providing very large and very high torque DC motors to overcome the electrostatic forces is impractical for reasons both of cost and power consumption. Since the inventors have discovered that even the background level of toner present on non-charged portions of photoreceptor belt 15 within an image area of the belt (an area which was scanned by image scanner 40) will significantly reduce the attractive forces between belts 15 and 20, then it is only the attraction between the belts which occurs when a fully charged non-image area of photoreceptor belt 15 is a transfer station 47 which must be overcome. The inventors have discovered that it is practical to use relatively small high torque DC motors to drive the belts through appropriate gearing arrangements in a manner which will allow the belts to slip by each other slightly when at least a background level of toner is deposited on the surface of the PC belt, even when transfer corona 48 is turned on. Therefore, controller 55 of the present invention contains information (described in greater detail in connection with FIG. 2) about the times within a copy cycle at which non-image areas of the photoreceptor belt will arrive at transfer station 47. This information is used to selectively turn transfer corona 48 off when these areas are in the transfer nip. It has been discovered that the reduction in attractive forces between the belts which results from turning off transfer corona 48 is sufficient to allow the belts to continue to slip in a slight and uniform manner past each other if they are being driven at slightly different speeds. Therefore, the environment of the present invention has been designed to overcome or control the attractive forces between photoreceptor web 15 and image receiving web 20 such that servos 50 and 51 can, in a smooth and continuous fashion, drive the belts at their target speeds even if these speeds differ slightly.

The distinctions between the present invention and the control apparatus shown in Palm's patent are somewhat subtle, but significant. First, the following should be appreciated. If the ratio N of the belt lengths is precisely 2 to 1, the problems of registration become trivial. As noted hereinabove, it was considered impractical to use belts for full color double transfer electrophotographic print engines by the prior art because of the inescapable slight variations in the ideal belt length ratio. Operating servos 50 and 51 independently, to have them drive their respective belts to constant rotational periods having the same ratio as the nominal belt lengths will (if successfully accomplished) cause each point on the photoreceptor belt to contact exactly the same point on the transfer belt during each PC belt rotation. Thus, so long as the belts can operate at slightly different speeds, there may be some smearing of the images if the belt length ratio deviates significantly from its nominal value, but registration will be correct. This will result from the fact that, if the length ratio deviates significantly from the ideal integer value, there will be a significant difference in the belts speeds even though the same points will be in contact as they move past each other. This will cause a smooth, continuous slip between the belts and can cause image smearing. However, since the belts are driven to cause the same points on the belt to contact each other, the effect of this will be to slightly smear the image rather than to cause misregistration.

It should first be noted that in full color electrophotography, slight amounts of image smear tend to degrade the perceived quality of the ultimate copy output less than misregistration. This is because misregistration phenomena tend to manifest themselves as sharp and inappropriate discontinuities in color at the edges of image elements. Smearing, while somewhat blurring and distorting the image, will normally be less offensive to the viewer of the printed output.

Naturally, if the belts are unable to move past each other at slightly different speeds, the photoconductor belt may experience slight accelerations when the seam areas are in contact if the error signal from the servo remains high due to the inability of motor 28 to drive same at its constant rotational period. This situation results when the attractive forces at image transfer station 47 are so great, and the belt length ratio differs from its nominal value sufficiently, that the error signal on line 62 will get large during a rotation of photoreceptor belt 15. The inventors of the present invention believe that this is the phenomenon which was taking place which led to the observation in the Palm's U.S. Pat. No. 4,652,115 attempts to drive belts of non-precise length ratios at slightly different speeds led to high error signals in the servos. It was not until the appropriate mechanisms which could control interbelt attractive forces were fully understood that the present invention, which allows for practical belt control at constant rotational periods for the two belts, became feasible in a practical and economical electrophotographic print engine.

The method and apparatus for accomplishing this aspect of the present invention was described hereinabove. In particular, at times when non-image areas of photoreceptor web 15 are passing through transfer station 47, transfer corona 48 is turned off. This leaves the range of attractive forces between the belts for all belt conditions which pass through transfer station 47 such that economically sized motors embodying motors 28 and 32 can be used to drive the belts with the desired constant rotational periods.

FIG. 2 is a detailed timing chart of the signals initiating a predetermined sequence of separated image creation and development steps for making a full color copy using the preferred embodiment of the present invention. The horizontal time axis of FIG. 2 is in machine ticks as described hereinabove. A parallel axis shown below the ticks axis gives equivalent time in seconds.

The vertical lines extending upwardly to labels show the time at which particular signals are output from control signal generator 90 (FIG. 1) in response to the ticks output from event timing clock 87. Thus, it should be understood that the ticks axis in FIG. 2 represents the output state of event timing clock 87 represented by line 89 on FIG. 1. Vertical tipped arrows 110a through 110f on FIG. 2 represent the time of occurrence of reference signals on line 86 from optocoupler 45 which indicate that the reference notch on transfer belt 20 has passed the reference station 45.

FIG. 2 is essentially self-explanatory, but it may be appropriate to go through an exemplary portion of the development cycle to relate the events depicted on FIG. 2 to the apparatus of FIG. 1. At the time of zero ticks, arrow 110a indicates an output signal on line 86. This is indicated as the start of the cycle. It should be noted that irrespective of the particular state of any dividing counters within the physical devices embodying event timing clock 87, the occurrence of the signal on line 86 causes event timing clock 87 to be set to the value of zero ticks. Any dividing counters are also reset to zero so that the ticks count of counter 87 will accurately represent the time since the last occurrence of a reference signal. Charging corona 41 is turned on 10 ticks after the start of the cycle by signals on line 95. Two ticks later, yellow toner module 39a is turned on by a signal on line 99.

A signal on line 96 activates image scanner 40, 40 ticks after the start of the cycle. Dashed dimension line 111a indicates the 40 tick time lag between the occurrence of a reference signal on line 86, which is indicated by arrow 110a, and the start of the scan. Since it is the start of the scan which determines the location of the separated yellow image on photoreceptor belt 15, this is the critical timed event with respect to image registration. Subsequently, the charging corona is turned off 112 ticks into the cycle and is left off for 52 ticks until it is turned on again for the start of the magenta scan.

Thus, the charging corona is off for almost nine tenths of a second. This prevents decoration of non-image areas of PC belt 15 which results in toner waste and possible contamination throughout the machine.

At the start of the cycle (zero ticks) transfer corona 48 is turned off. The transfer corona is turned on, as indicated on FIG. 2, 152 ticks into the copy cycle. This is the time at which the leading edge of the image area on photoreceptor belt 15 arrives at transfer station 47 (FIG. 1). It should be noted, from the first group of events shown on the left hand side of FIG. 2, that charging corona 41 is activated for 30 ticks before activation of image scanner 40 for the yellow separated image. This means that there is a charge non-image area being created on photoreceptor belt 15 for 30 ticks. Given the belt speed and tick time, this leads to creation of a fully charged non-image area of approximately 95.5 millimeters in length which precedes the latent, and subsequently developed, yellow separated image on the belt. As noted hereinabove, to the extent practical within the constraints of the rise time for development module decorator brush development to occur, such areas pass under only deactivated toner modules. It is this fully charged undecorated area which would, if not compensated for in some manner, cause belts 15 and 20 to become physically locked to the same rotational speed as the area enters transfer station 47, It is the selective deactivation of transfer corona 48, which is the initial condition of the start of the copy cycle, which allows the belts to continue to slide past each other if they are being driven at slightly different speeds.

Thus, the activation of the transfer corona at 152 ticks represents the time at which the leading edge of the developed yellow separated image arrives at a transfer station 47. As noted above, sufficient toner will be present, event if only in background amounts, to allow the belts to continue to slide while this portion of the photoreceptor belt is passing through the transfer station. This prevents the generation of large error signals within servos 50 and 51 and also prevents step wise incremental slips in the belt which would have disastrous effects on registration.

Approximately 154 ticks after initiation of the copy cycle, another reference pulse appears on line 86. This event is depicted by arrow 110b on FIG. 2 shown to occur at 154 ticks. It should be noted that, in response to the reference signal on line 86, the output of event timing clock 87 is forced, aor set, to the predetermined value of 154 even if it had not quite counted to 154 prior to the occurrence of the signal, or had counted slightly past 154. A similar sequence for creation and development of the magenta separated image begins at 154 ticks into the cycle as indicated by arrow 110b. It should be noted that dashed dimension line 111b show that the start of the scan for the magenta image at 194 ticks is exactly 40 ticks after the occurrence of the last reference pulse on line 86 which set event clock 87 to its 154 tick count. Transfer coronal 48 is turned off at 254 ticks and reactivated at 306 ticks, to reduce the attractive force between the belts for approximately 52 ticks. This corresponds to the approximately 165.5 millimeters of charged non-image area which precedes the arrival of the leading edge of the magenta image at the transfer station.

Similar results obtain when the third pulse of the cycle appears on line 86, as indicated at arrow 110c. Dashed dimension line 111c shows that the start of the scan for the cyan image occurs 40 ticks after event timing clock 87 is set to the predetermined value of 308 ticks.

From inspection of FIG. 2, the following should be apparent. Even if the desired rotational period of the transfer belt of exactly 154 ticks is not precisely accomplished, the event timing clock is always set to an appropriate modulo 154 value upon each occurrence of a reference pulse on line 86. Thus, physically, the distance between adjacent ones of arrows 110 may be slightly more or slightly less than 154 ticks. However, the events timed from each occurrence of the setting of clock 87 to a modulo 154 value is precise since these events are dictated by the value of the clock. Thus the inbound physical link between operation of the machine and clock 87 is its setting to predetermined values each time the reference point on transfer belt 20 passes the reference station.

From inspection of the tick values for the events shown on FIG. 2, several aspects of operation of the preferred embodiment will be appreciated. First, it should be noted that the time between the presetting of event timing clock 87, indicated by one of lines 110, and the activation of the respective toner modules 39a through 39c varies with each pigment. This is done because of the different physical distances between image scanner 40 and toner modules 39a through 39c. Thus, it may be seen that yellow toner module 39a is turned on 28 ticks prior to the beginning of the yellow scan. This gives module 39a sufficient time to develop an appropriate decorator brush to develop the latent yellow image being developed on photoreceptor 15 by scanner 40. There is only a three tick difference between the time that the magenta toner module 39b is activated and the start of the magenta scan at 194 ticks. This is because a greater period of time is required for the leading edge of the image to travel from image scanner 40 to its position underneath the magenta toner module 39b. When the cyan image is developed, the scanner is turned on at 348 ticks. Prior to activation of cyan toner module 39c at 369 ticks. This is because the magenta toner module 39c is even farther from the scanner. It is desirable to turn the toner module on with the minimum required lead time required for it to develop a good toner brush prior to the leading edge of the latent image reaching the toner module.

501 ticks into the cycle, paper picker 46 is activated by a signal on line 100, as indicated on FIG. 2. It is subsequently turned off. It will be apparent that paper picking has occurred, and the leading edge of the composite full color image is being transferred to the paper at the same time the trailing edge of the developed cyan image is being transferred from photoreceptor belt 15 to transfer belt 20. Similar and appropriately timed signals are provided to control operation of the fuser (not shown) but same are not shown on FIG. 2.

It should be noted that the tick values illustrated on FIG. 2 are those for a conventional 8½ inch sheet of paper popular in the United States. Appropriate adjustments in the tick values for the event for copies of different length will be apparent to those skilled in the art, and all of the information necessary to calculate same is provided in the specification since the lengths and operating speed of the belts are provided.

When the copier in which the preferred embodiment resides is in a monochrome black mode of operation, the charging corona is turned on at 10 ticks, the scanner is turned on 40 ticks after the occurrence of the reference pulse indicating the start of the cycle, just as is the case with the separated color images. The black toner module 39e is turned on 86 ticks after the beginning of the cycle since it is farther downstream from image scanner 40 than any of the process color modules. The charger is turned off at 112 ticks and the paper picker is activated between 209 and 283 ticks. The toner module is turned off at 336 and the machine is ready for another copy cycle.

When a print engine embodying the present invention is used in a laser printer or digital copier which darkens certain saturated areas of the image by laying down a monochrome black image prior to application of the processed colors, an additional subcycle is added in which the scan and toner tick values recited above for monochrome black are executed first. This is followed by provision of the copy creation and development steps shown on FIG. 2. It will be appreciated that in this mode of operation, all of the signal timings shown on FIG. 2 will simply be shifted to the right by 154 ticks.

The functions represented by seam alignment block 82 within controller 55 serve to monitor the seam alignment, after it is initially adjusted, as described hereinabove. Since the inputs to the seam alignment block are the reference signals on lines 86 and 85 from optodetectors 45 and 42, respectively, the seam alignment function monitors the period of time by which the respective reference signals from each of the belts lead or lag one another from their ideal timing which would indicate proper seam alignment. If seam area misregistration gets sufficiently large, copying will be interrupted for reregistration of the seam areas. It should be noted that in the preferred embodiment, this will be a very rare event since it will be rare that the deviation of the ratio of belt lengths will be so great as to cause the seam alignment to become problematic. Naturally, the potential problem created is creep of the seam area of photoreceptor belt 15 into the area in which latent images are developed by scanner 40.

The continuous cycling of the sequence of events shown on FIG. 2 is maintained for each copying job. Thus, if 15 or 20 copies of the same document are being made, the entire 15 copy sequence will be initiated by a copy start signal on line 75. If, however, seam misregistration becomes sufficiently large during the middle of a copying job, the output from seam alignment block 82 on line 83 indicates that further output of separated image creation and development control signals from control signal generator 90 is inhibited. The signal on line 81 then indicates to target position calculator function 76 that it is time to reregister the seams before proceeding with completion of the copying job.

It is important to note that any seam realignment which occurs in the preferred embodiment, in response to signals from seam alignment block 82, is only done after the completion of a complete copy cycle, i.e., the creation and transfer of all images necessary for a single copy of final output. Therefore, at any time seam alignment block 82 detects seam misregistration above a predetermined threshold value, it will output a signal to other circuits in controller 55 indicating that it is time to perform the seam registration steps. However, no action will be taken to correct for seam misregistration until all of the steps necessary to create the most recently started copy have been completed. Under these circumstances, the copying job will be interrupted, seam registration will take place, in the same manner it did when the copying job began, and a new copy cycle for the next printed copy output will be begin to complete the copy job then in progress.

As a practical matter, the present inventors have found that this invention achieves the desired constant rotational periods for belts within a practical range of tolerances with respect to their ideal length ratio such that mid-job seam reregistration simply does not take place. Copy jobs constituting 50 or 100 copies have been run without any need for reregistering seam alignment.

From the foregoing description of the method and apparatus of the preferred embodiment, other embodiments of the present invention may suggest themselves to those skilled in the art. Thus, it is to be understood that the scope of the present invention is to be limited only by the claims below.

We claim:

1. A method of operating a color electrophotographic print engine of the type having a flexible movable image receiving web of a predetermined length L and a flexible movable photoreceptor web of a length nominally equal to N X L, N being am integer greater than zero, and selectively operable means for providing a copy start signal comprising the steps of:
    (a) driving said image receiving web with a first servo controlled motor to cause said image receiving web to rotate at a first constant rate such that it makes one revolution in each predetermined time period T;
    (b) driving said photoreceptor web with a second servo controlled motor to cause said photoreceptor web to rotate at a second constant rate such that it makes one revolution in each predetermined time period N X T;
    (c) detecting the passage of a predetermined reference point on said image receiving web past a reference station and setting an event timing clock to a predetermined value in response thereto;
    (d) sequentially initiating a predetermined sequence of separated image creation and development steps, each of said steps being initiated a respective one of a set of predetermined periods of time after said setting of said event timing clock to said predetermined value;
    (e) repeating steps (c) and (d) for each of a plurality of separated images until a composite developed image is completed on said image receiving web.

2. A method of operating a color electrophotographic print engine as recited in claim 1 wherein:
    one step of said predetermined sequence of separated image creation and development steps is a step of de-energizing a transfer corona at a transfer station at which said photoreceptor web and said image receiving web contact each other; and
    said respective one of a set of predetermined periods of time after said setting of said event timing clock to said predetermined value at which said de-energizing takes place corresponds to an arrival of a non-image area of said photoreceptor web at said transfer station.

3. A method of operating a color electrophotographic print engine of the type having a movable image receiving web of a predetermined length L, said movable image receiving web being of the type having a non-image receiving area on a predetermined portion of the surface thereof, and a movable photoreceptor web of a length nominally equal to N X L, said movable photoreceptor web being of the type having a non-image developing area on a predetermined portion of the surface thereof, N being an integer greater than zero, and selectively operable means for providing a copy start signal comprising the steps of:
    (a) driving said image receiving web with a first servo controlled motor to cause said image receiving web to rotate at a first constant rate such that it makes one revolution in each predetermined time period T;
    (b) detecting the passage of a first predetermined reference point on said image receiving web past a first reference station and providing a first reference signal in response thereto;
    (c) driving said photoreceptor web with a second servo controlled motor to cause said photoreceptor web to rotate at a second constant rate such that it makes one revolution in each predetermined time period N X T;
    (d) detecting the passage of a second predetermined reference point on said photoreceptor web past a second reference station and providing a second reference signal in response thereto;
    (e) aligning said non-image receiving area and said non-image developing in response to said first an second reference signals;
    (f) setting an event timing clock to a predetermined value in response to each occurrence of said first reference signal;
    (g) continuing to drive said image receiving web with said first servo controlled motor to cause said image receiving web to rotate at said first constant rate such that it makes one revolution in each said predetermined time period T;
    (h) continuing to drive said photoreceptor web with said second servo controlled motor, independently of said first servo controlled motor, to cause said photoreceptor web to rotate at said second constant rate such that it makes one revolution in each said predetermined time period N X T;
    (i) sequentially initiating a predetermined sequence of separated image creation and development steps, each of said steps being initiated a respective predetermined period of time after said setting of said event timing clock to said predetermined value;
    (j) repeating steps (f) through (i) for each of a plurality of separated images until a composite developed image is completed on said image receiving web.

4. A method of operating a color electrophotographic print engine as recited in claim 3 wherein;
    one step of said predetermined sequence of separated image creation and development steps is a step of de-energizing a transfer corona at a transfer station at which said photoreceptor web and said image receiving web contact each other; and
    said respective one of a set of predetermined periods of time after said setting of said event timing clock to said predetermined .value at which said de-energizing takes place corresponds to an arrival of a non-image area of said photoreceptor web at said transfer station.

5. In a color electrophotographic print engine of the type having a flexible movable image receiving web of a predetermined length L and a flexible movable photoreceptor web of a length nominally equal to N X L, N being an integer greater than zero, and selectively operable means for providing a copy start the improvement comprising:

a first servo controlled motor means for driving said image receiving web and causing said image receiving web to rotate at a first constant rate such that it makes one revolution in each predetermined time period T;

a second servo controlled motor means for driving said photoreceptor web and causing said photoreceptor web to rotate at a second constant rate such that it makes one revolution in each predetermined time period N X T;

means for detecting the passage of a predetermined reference point on said image receiving web past a reference station and for providing a reference signal in response thereto;

an event timing clock;

control means for setting said event timing clock to a predetermined initial value in response to each occurrence of said reference signal and for sequentially providing a predetermined sequence of temporally spaced image creation and development control signals, each of said control signals occurring a respective one of a set of predetermined periods of time after said setting of said event timing clock to said predetermined initial value;

whereby, a plurality of separated images are registered onto said image receiving web until a composite developed image is completed on said image receiving web.

6. The improvement recited in claim 5 wherein said image receiving web is of the type having a non-image receiving area on a predetermined portion of the surface thereof, said movable photoreceptor web is of the type having a non-image developing area on a predetermined portion of the surface thereof, and said control means further comprises:

means operative in response to each occurrence of said copy start signal for aligning said non-image receiving area to contact said non-image developing area as said photoreceptor web and said image receiving web move in response to said first and second reference signals prior to providing a first one of said image creation and development control signals.

7. The improvement as recited in claim 5 wherein:

one of said image creation and development control signals is a transfer corona control signal for selectively de-energizing a transfer corona at a transfer station at which said photoreceptor web and said image receiving web contact each other when a non-image area of said photoreceptor web is in said transfer station.

* * * * *